(12) United States Patent
BeSerra et al.

(10) Patent No.: US 10,678,721 B1
(45) Date of Patent: Jun. 9, 2020

(54) COMMUNICATION LINK TESTING

(71) Applicant: Amazon Technologies, Inc., Seattle, WA (US)

(72) Inventors: Christopher James BeSerra, Federal Way, WA (US); Ron Diamant, Albany, CA (US); Alex Levin, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 15/422,793

(22) Filed: Feb. 2, 2017

(51) Int. Cl.
*G06F 3/01* (2006.01)
*G06F 13/22* (2006.01)
*G06F 13/10* (2006.01)
*G06F 13/40* (2006.01)
*G06F 13/42* (2006.01)
*G06F 11/22* (2006.01)

(52) U.S. Cl.
CPC .......... *G06F 13/22* (2013.01); *G06F 11/2221* (2013.01); *G06F 13/102* (2013.01); *G06F 13/4081* (2013.01); *G06F 13/4282* (2013.01); *G06F 2213/0026* (2013.01)

(58) Field of Classification Search
CPC ... G06F 13/00; G06F 3/00; G06F 1/00; G06F 5/00; G06F 8/00
USPC ..................................... 710/300–306, 19, 54
See application file for complete search history.

(56) References Cited

U.S. PATENT DOCUMENTS

| | | | |
|---|---|---|---|
| 2003/0182482 A1* | 9/2003 | Creta ................... | G06F 13/4027 710/104 |
| 2012/0047308 A1* | 2/2012 | Feng .................... | G06F 13/4059 710/311 |
| 2013/0219194 A1* | 8/2013 | Gong .................... | G06F 11/261 713/300 |
| 2015/0254202 A1* | 9/2015 | McGlone .............. | G06F 1/3278 710/316 |

* cited by examiner

*Primary Examiner* — Tim T Vo
*Assistant Examiner* — Kim T Huynh
(74) *Attorney, Agent, or Firm* — Klarquist Sparkman, LLP

(57) ABSTRACT

A smart add-in card can be leveraged to perform testing on a host server computer. The add-in card can include an embedded processor and memory. Tests can be downloaded to the add-in card to test analog features of a communication bus between the host server computer (motherboard) and the add-in card. In a particular example, a PCIe communication bus couples the motherboard to the add-in card and the tests can test a connection or communication link negotiated between the add-in card and another device using the PCIe communication bus. The tests can be developed to test errors that are typically difficult to test without the use of special hardware. However, the smart add-in card can be a simple Network Interface Card (NIC) that resides on the host server computer during normal operation and is used for communication other than error testing.

20 Claims, 9 Drawing Sheets

COMMUNICATION LINK TESTING

BACKGROUND

Computer networks can include a plurality of server computers interconnected within, for example, a data center. The server computers typically include expansion boards (also called expansion cards) which can be inserted into expansion slots on the server computers to add functionality to the computer system. A server computer communicates with the expansion cards through an expansion bus which electrically connects the internal hardware of the computer with peripheral devices. One type of expansion card includes a network interface card (NIC), which typically provides the server computer with a dedicated, full-time connection to a network.

One type of expansion bus is a Peripheral Component Interconnect Express (PCIe) bus, which is a high-speed serial computer expansion bus standard. Other bus types can also be used in place of the PCIe bus, such as the ASUS media bus, the multi-bus, SBUS, etc. Expansion cards that include a CPU and/or DRAM are considered to be "smart" cards. The smart expansion cards can be programmed to run various software applications that enable the card to provide increased flexibility over typical hardware-only interface cards.

The expansion cards can have various types of error reporting. For example, PCIe uses the advanced error reporting (AER) to report errors to the host server computer. Example errors can include a link error, a parity error, etc. However, there is limited testing for communication links over the PCIe bus. For example, two PCIe devices (e.g., a root complex and an end point) exchange training sequences to negotiate link parameters, such as data rate, channel width, lane polarity, etc. In order to implement the negotiation, a link training and status state machine (LTSSM) is used. In some cases, the PCIe devices are attached externally to systems via cables, which provides a means by which errors can occur due to rework by technicians or attacks by malicious technicians. Additionally, the expansion cards represent a vulnerability for attacks from malicious software, which can take over the expansion cards and perform acts to disrupt operations of the expansion cards. Routine and reliable testing methods for communication links are needed.

DETAILED DESCRIPTION

Figure 1:
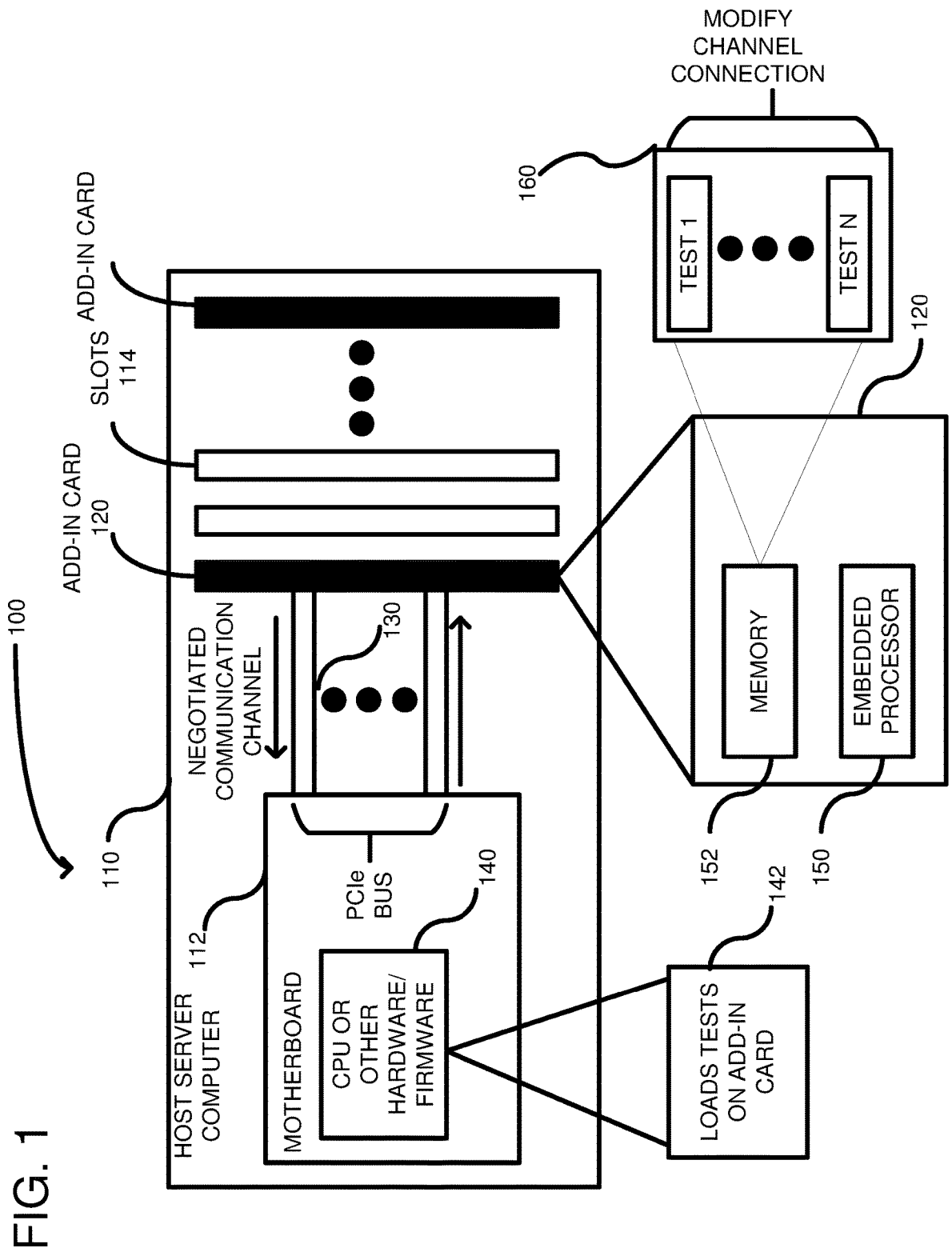
FIG. 1 is an example system diagram showing a host server computer including one or more add-in cards for testing a connection.

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

A cloud environment and virtualization hardware allow multiple tenants to share communication links between devices, such as PCIe devices. Single root IO virtualization (SR-IOV) and alternative routing ID (ARI), which are used in partitioning PCIe devices, have created a complex bus structure with potentially thousands of PCIe functions present in a system. In addition, PCIe vulnerability is heightened due to cabling, which is an area in which a malicious actor can introduce security threats.

In one embodiment described herein, a method provides testing capabilities to test system robustness by varying devices attached to the system. For example, the method can logically drop a device from the bus to simulate a hung device that does not respond to traffic. Similarly, devices can be logically hot removed, such as, for example, an add-in card can be logically removed from a remote location without having to physically remove the card from a server computer. In another example, devices can be added to the system, such as a hot-plug addition to a server computer. In still further examples, security intrusion attempts can be modeled and tested to understand how the system responds. For example, the method can test scenarios in which devices are removed and replaced with a rogue agent that attempts a security intrusion. In still other examples, the bus speed and bus width can be dynamically changed while an external server computer monitors how the system responds. In still further examples, noise can be introduced on a communication channel and monitoring can be used to see how the system responds.

In another embodiment, system robustness (operating system, hypervisor, security, hot-plug add/remove, error handling) is tested by varying the PCIe devices attached to a system. Using a smart add-in card as the implementation vehicle, the test system generates multiple test cases to test system capability. A "smart add-in card" (for example, a smart Network Interface Card (NIC)) is an add-in card that has an embedded CPU and memory (e.g., DRAM), and can be programmed to execute various software applications. Host tools can allow control of the smart add-in card from the host server computer. For example, in the case where a communication bus is PCIe, the host server computer can act as the PCIe Root Complex. The host tools can be used to communicate with the smart add-in card over PCIe using the Base Address Registers (BARs) to transfer data so as to make the smart card perform various operations. Using these host tools, binaries can be sent to the smart card to execute specific software testing operations. For example, the binaries can be such that the smart add-in card is used as a testing device for deliberately triggering hard-to-reach errors. More specifically, analog-based areas of a PCIe communication link can be tested through manipulation of the hardware or software on the add-in card. For example, the SerDes controller or repeater hardware can be manipulated after a communication link is established to logically simulate a hung card, removed card, or added card. Likewise, PCIe-based state machines within the PCIe controller can be manipulated to place the controller in an incorrect state, as an example of a rogue agent performing a security intrusion. Such error testing can be controlled and monitored remotely. The technology described herein provides the ability to check how the host server computer handles such error events to ensure that it has the ability to protect itself from a physical access of an attacker over a PCIe communication bus and from any failure that could harm the server or its associated software. As discussed herein, the host server computer refers to a motherboard to which other components can be coupled. Add-in cards, while being physically in the same chassis as the motherboard, in at least some cases operate as an independent logical computer. Likewise, a peripheral component can be used in place of an add-in card. For example, the peripheral component can be physically located on the motherboard, but communicates with the main processor through a PCIe communication bus.

Thus, a smart add-in card can be leveraged to perform testing on a host server computer. The add-in card can include an embedded processor and memory. Tests can be downloaded to the add-in card to test analog features of a communication bus between the host server computer (motherboard) and the add-in card. In a particular example, a PCIe communication bus couples the motherboard to the add-in card and the tests can test a connection negotiated between the add-in card and another device using the PCIe communication bus. The tests can be developed to test errors that are typically difficult to test without the use of special hardware. Any smart add-in card can be used. However, the smart add-in card can be a simple Network Interface Card (NIC) that resides on the host server computer during normal operation and is used for communication other than error testing. By using the NIC as a testing device, repeatable and reliable testing can be obtained.

FIG. 1 shows a system 100 including a host server computer 110. The host server computer includes a motherboard 112 and multiple slots 114 for receiving one or more add-in cards 120. The motherboard 112 is coupled to the add-in cards 120 via a communication bus 130, such as a PCIe bus or other type of communication bus (e.g., ASUS media bus, SBUS, etc.). The motherboard 112 includes a CPU 140 or other hardware/firmware for executing commands (e.g., in software) to the add-in cards 120 via the communication bus 130. Example commands include commands to load and execute tests on the add-in card, such as is shown at 142. The add-in card 120 is considered a "smart card" due to an embedded processor 150 and a memory 152. The memory 152 can be used for storing a plurality of tests 160, such as test 1 through test N, which corresponds with tests 142. Such tests can be used for testing a communications channel coupled to the add-in cards, such as analog aspects of the communication bus 130. The tests 160 can be loaded and triggered from the motherboard 112 or from a remote server computer (not shown).

When using the PCIe protocol, the host server computer operates as a PCIe root complex and the add-in card acts as a PCIe endpoint. Alternatively, the add-in card can operate as the root complex. If other protocols are used, then the host server computer and add-in card assume the corresponding roles under the particular protocol.

In sum, an add-in card used in normal operation of the host server computer can be leveraged for in-depth PCIe communication link testing. The add-in card can be a NIC for allowing communication between the host server computer 110 and other network devices. Other add-in cards can be used, but such add-in cards should include an embedded processor, or other hardware that can execute a software agent, and memory. Example add-in cards include the following: cryptographic smart cards, SATA smart cards, etc. The software agent executing thereon can manipulate an already-negotiated communication link to dynamically modify a communication channel width, data rate, polarity, etc. Such dynamic modifications (without further negotiation) can represent error conditions that violate normal protocol behavior. Similarly, the software agent can dynamically modify a communication link state machine or communication link hardware to simulate a hostile attack of the add-in card. Monitoring software located on the host server computer or remotely can then monitor how the host server computer responds to such anomalous conditions.

Figure 2:
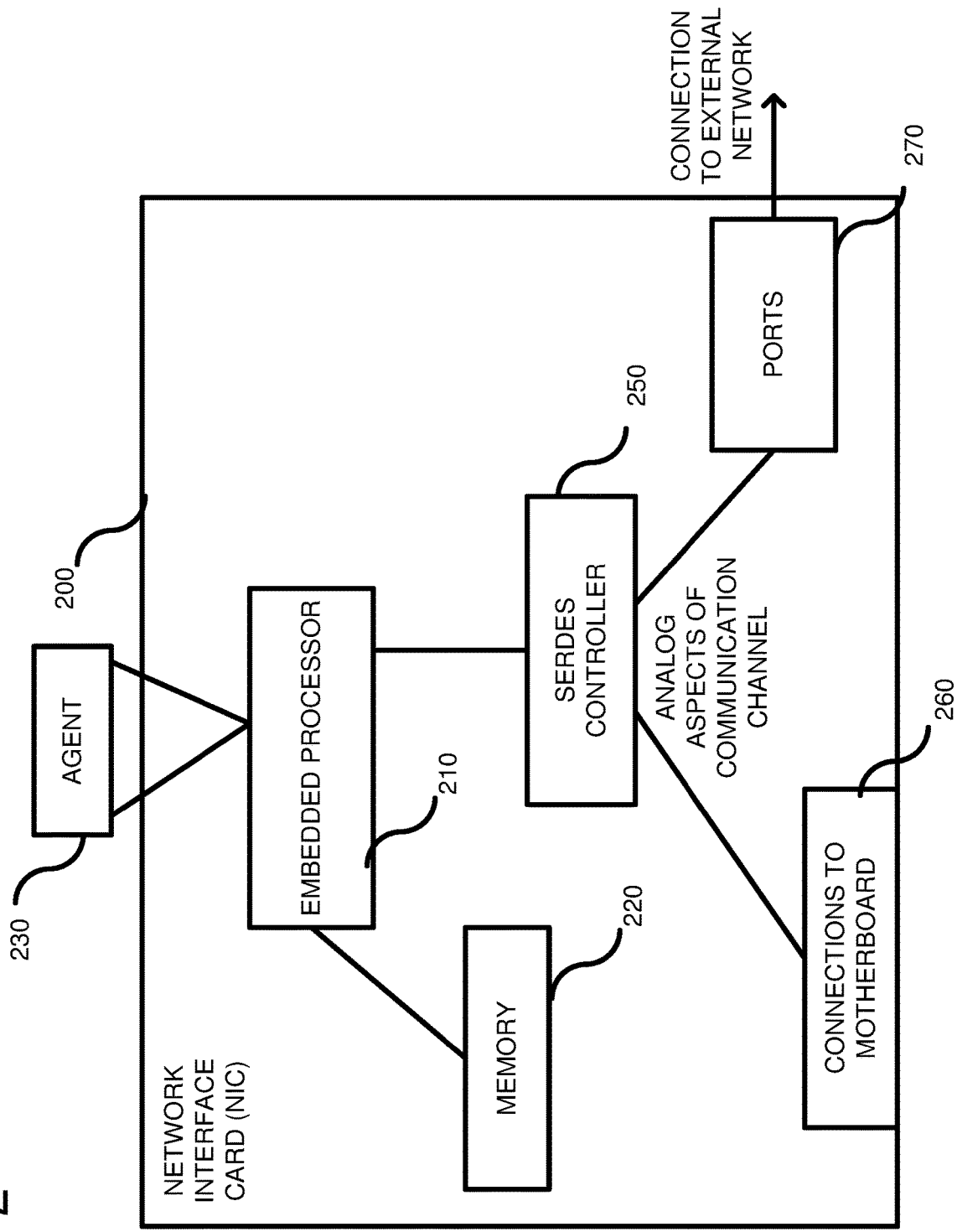
FIG. 2 shows an example add-in card, which in this case is an NIC, including a Serializer/Deserializer (SerDes) hardware component.

FIG. 2 show one embodiment of an add-in card 200, wherein the add-in card is a NIC. The add-in card includes an embedded processor 210 and a memory 220 for storing testing code and/or instructions for executing an agent 230. The embedded processor 210 can be a micro-controller, a processor or other hardware/firmware used for implementing processor—like functionality. The memory 220 can be a DRAM or other types of memory capable of having the tests stored and readable by the embedded processor 210. The embedded processor 210 executes the agent, which includes connection testing routines, so as to test connections established with the add-in card. In one aspect, the agent 230 can test analog portions of the communication channels, such as speed, width and polarity of the communication channel. The add-in card 200 can further include a SerDes controller 250, which controls serial-to-parallel conversion for communication between the embedded processor 210 and devices coupled to the add-in card, such as through a connector 260 or one or more ports 270. In the case of the connector 260, the add-in card can communicate with the host server computer motherboard or other add-in cards plugged into the host server computer. The connections to the motherboard 260 can be through a standard slot-type receptacle that are readily available in server computers. Example bus connections include, but are not limited to, PCIe, traditional PCI, Accelerated Graphics Port (AGP), Industry Standard Architecture (ISA), Micro Channel Architecture (MCA), etc. In the case of the ports 270, the add-in card can communicate with devices coupled to the host server computer through cables. The ports 270 can include any variety of network connections such as Ethernet, LAN, etc. The NIC can serve dual functionality: in normal-operating mode, it can allow the host server computer to communicate over an external network; and in a test mode, it can use its processor 210 and memory 220 to receive and execute tests from the host server computer to test the communication links established over the connections 260 or the ports 270.

In any event, the embedded processor can negotiate with such other devices to establish a connection (also called a communication link, such as a PCIe link) over a communication channel (made up of electrical connections, such as lanes, which include signal wires). Once a connection is established between devices, packets can be passed over the connection. Negotiation can include establishing a plurality of agreed upon communication-channel parameters, such as speed (e.g., data rates, such as 2.5 GB, 5 GB, 12 GB, etc.), channel width (e.g., how many lanes are included in the communication channel) and polarity of the lanes. Once the connection is established, the agent can execute one or more tests (see FIG. 1 at 160) to modify the connection. Modifying the connection can include dynamically changing any of the previously negotiated communication-channel parameters, without re-negotiation. Other analog aspects of the connection can also be changed, such as introducing noise on the communication channel through manipulation of the SerDes controller. Additionally, any desired characteristics of the connection can be changed, such as a status change, a speed change, etc. Thus, the add-in card 200 is operating under an error condition to purposely test analog aspects of the connection and determine how the host server computer responds to such error conditions. In this way, if a hacker introduces software on an add-in card that manipulates a connection state machine or the communication channel hardware, such as the SerDes controller 250, such manipulations can be previously tested and handled in a manner to ensure customer data and system integrity is maintained secure.

Figure 3:
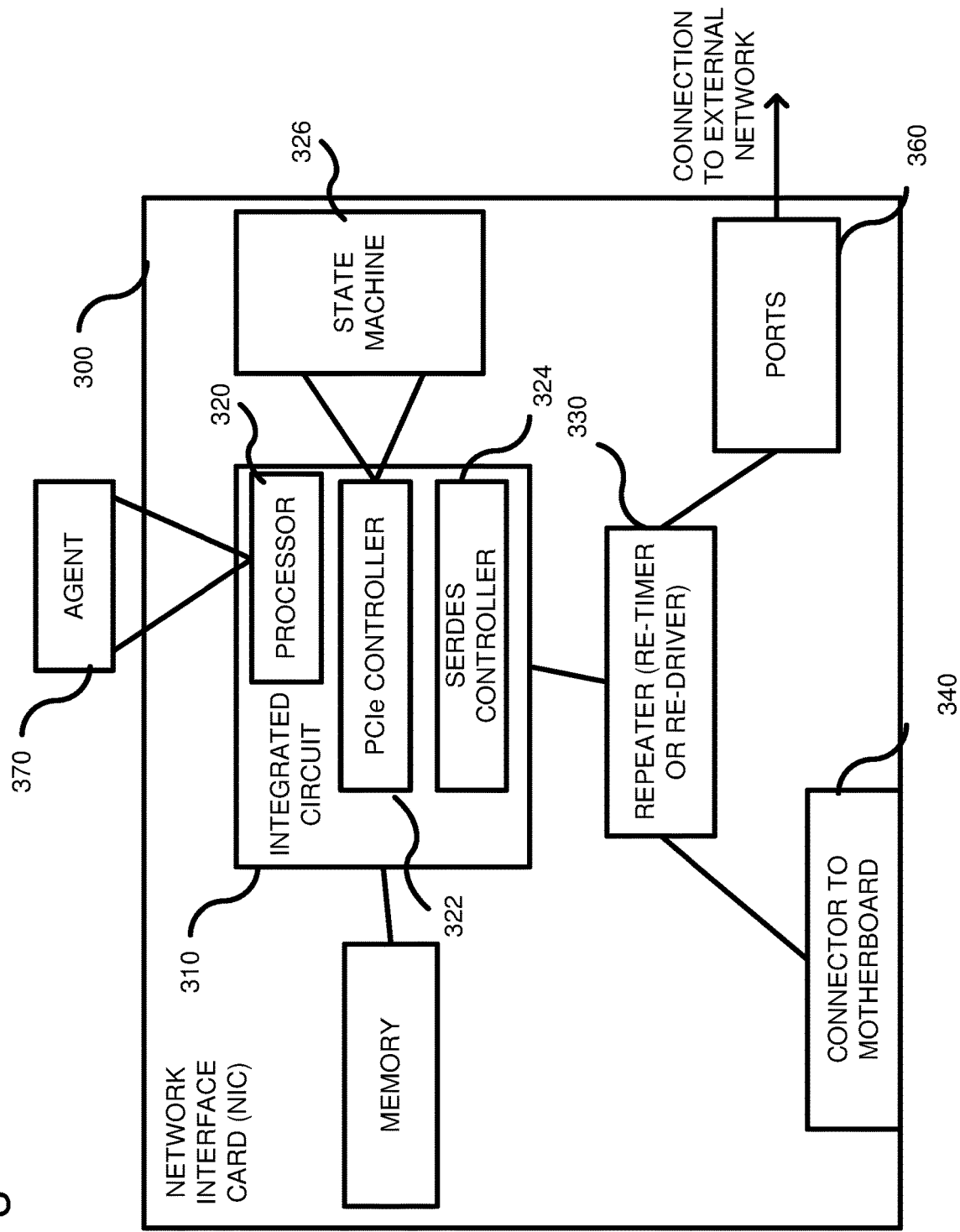
FIG. 3 shows an example of another embodiment of an add-in card, including a repeater circuit.

FIG. 3 is another example embodiment of a NIC 300. The NIC in this embodiment can include an Integrated Circuit (IC) 310, such as a System-on-Chip (SOC), ASIC, FPGA, etc. that includes a processor 320, a PCIe controller 322 and a SerDes controller 324. The PCIe controller 322 can execute a state machine 326, which in this example is a link training and status state machine (LTSSM) used to negotiate and control a communication link. The PCIe controller can be swapped for other controllers and other state machines depending on the desired protocol used for the communication channel. The SerDes controller 324 can be coupled to a repeater 330, which can include a re-timer, a re-driver or a combination of functionality from each. A re-timer can establish its own connections with the PCIe controller and external devices through a connector 340 or ports 360. In the case of a re-driver, it boosts analog signal levels to a desired transmission level. The connector 340 allows the NIC to be coupled to the system bus (including the motherboard), while the ports 360 allow connection to external devices connected to the host server computer through cables. In both cases of the connector 340 and the ports 360, connections can be established between the IC 310 and devices external to the NIC 300. Testing of the connections can be accomplished using an agent 370 executing within the IC 310, such as on the processor 320. As described further below, the agent 370 can be used to modify the state machine 326, or dynamically change the connection through manipulation of hardware on the NIC 300, such as through modification of the SerDes controller 324 or the repeater 330. In one example, either the SerDes controller 324 or the repeater 330 can be turned off by the agent 370 so as to make it appear that the NIC 300 has been removed (hot remove) from the host server computer. Similarly, the agent 370 can turn the SerDes controller 324 or the repeater 330 back on so as to simulate a hot-plug in of the NIC. In either case, the NIC is not physically removed from the system, but nonetheless it appears that way to the host server computer and any external devices. The agent 370 can further manipulate the state machine 326 to make it appear as though the NIC is in a hung state. For example, the state machine 326 can be manipulated so as to be in a continuous loop. Such errors with the connection can impact the host server computer and the host server computer should identify such errors and take corrective action. For example, client data should not be exposed or otherwise compromised by the disruption to the connection.

Figure 4:
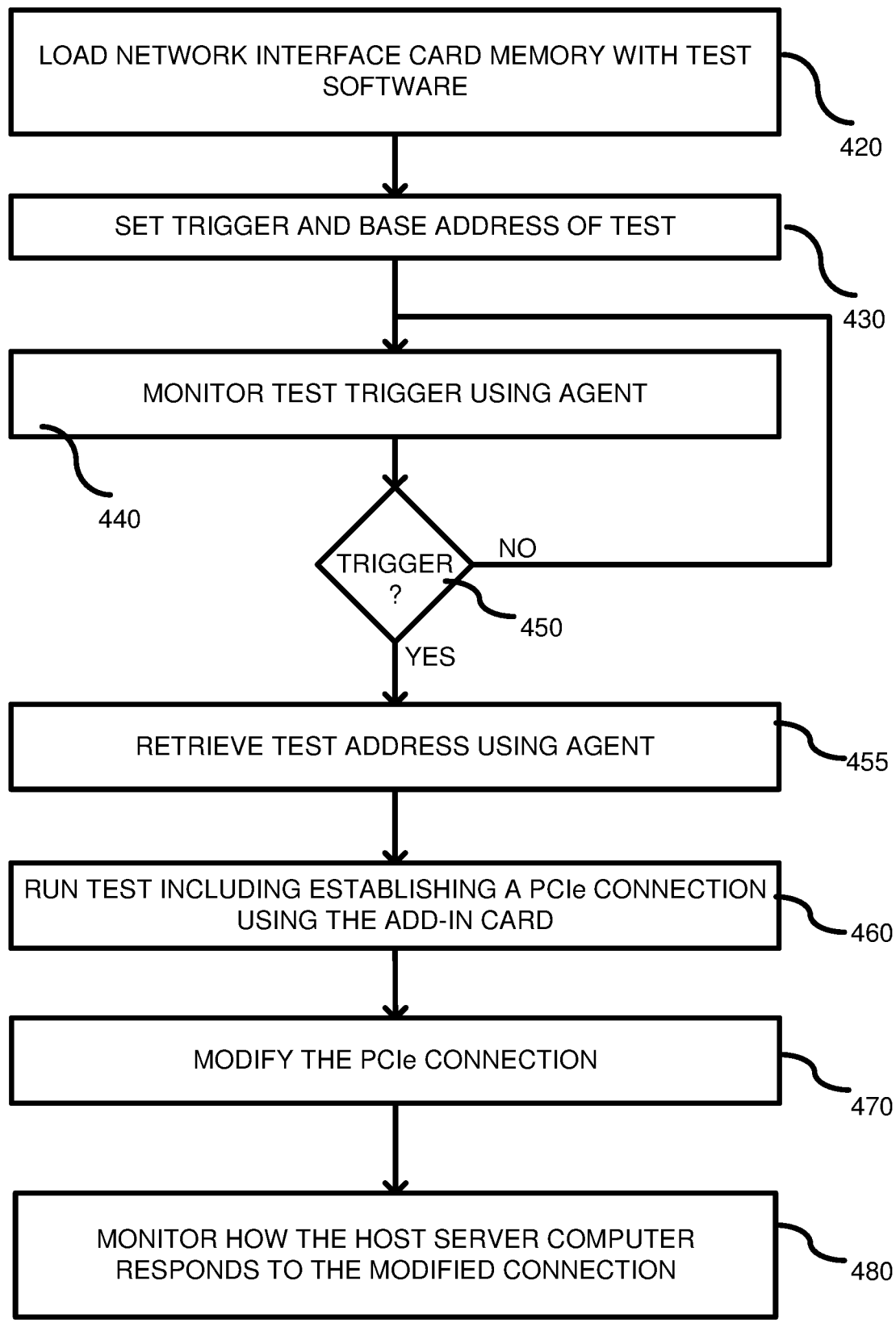
FIG. 4 is a flowchart according to one embodiment for testing a PCIe connection.

FIG. 4 is a flowchart according to one embodiment for testing a connection over a communication channel in a host server computer. In process block 420, an add-in card, such as a NIC, can have test software downloaded into memory on the add-in card. In one example, the host server computer can load the NIC memory with test software using a Base Address Register (BAR). The test software can be any desired software tests for testing a connection over the communication channel between the host server computer's motherboard and the add-in card or between the add-in card and an external device. In alternative embodiments, the test software can be downloaded to the NIC from an external host server computer, such as through the above-described ports on the NIC. In process block 430, once the tests have been loaded, the host server computer can set a trigger flag and a base address where the test is located. In process block 440, the agent executing on the NIC can read the trigger flag and determine that a test is ready to be executed. The agent can then obtain the base address of the test and jump to that address so as to begin execution of the test. In decision block 450, if the trigger flag is not yet set, then the agent loops on monitoring the trigger flag. However, if the trigger flag is set, then in process block 455, the agent retrieves the test address from memory and runs the test (process block 460). For example, the test can include establishing a PCIe connection with the host server computer or an external device (including another add-in card or a device external to the host server computer). In process block 470, the agent can modify the one or more connections established with the NIC. Modifying the one or more connections can include changing previously-negotiated parameters associated with the communication channel, such as channel width, data rate and polarity. Other negotiated parameters can also be changed. Modifying can further include changing other characteristics of the communication channel, such as functionality of a repeater or a SerDes controller associated with the communication channel. Finally, in process block 480, the host server computer can be monitored to see how it responds to the generated errors created by the tests. Thus, difficult to test errors can be effectively tested through the use of tests loaded onto standard hardware within the host server computer. Consequently, special test hardware does not need to be separately installed on the host server computer. Instead, the host server computer can execute tests in a test mode and then switch to a normal operating mode without the need to plug or unplug testing hardware into the host server computer environment. This provides flexibility for testing to occur anytime and controlled from a remote location, such as a remote host server computer.

Figure 5:
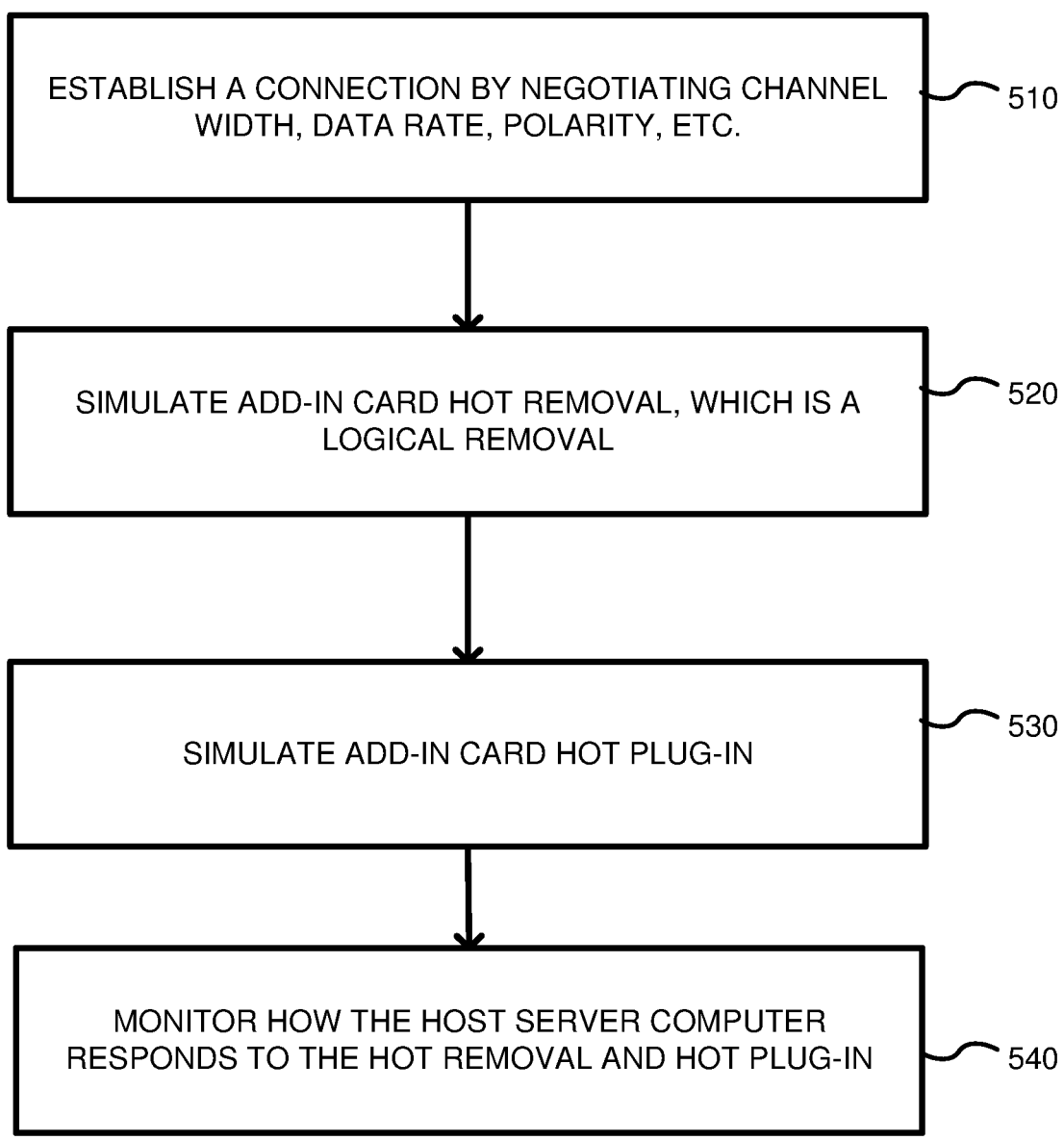
FIG. 5 is a flowchart according to another embodiment for simulating hot-plug and hot-removal of an add-in card.

FIG. 5 is a flowchart according to an embodiment for simulating hot removal and hot plug-in of an add-in card. In process block 510, a connection can be established through a negotiation between the add-in card and another device, such as the motherboard, another add-in card or an external device. Establishment of the connection includes negotiating parameters that both the add-in card and the other device agree are supported by both devices. Example parameters include data rate, channel width, lane polarity, etc. In process block 520, a hot removal of an add-in card can be simulated. Hot removal includes power being continuously supplied to the add-in card while its removal is simulated to have occurred. By simulated, it is meant that to the other devices coupled to the add-in card, it appears as though the add-in card was removed. However, such removal is only logical (not physical) as the add-in card remains coupled in the slot on the host server computer. Example simulation can be accomplished through the agent by manipulating communication channel hardware (e.g., the SerDes controller). In one example, the SerDes controller can be powered off or otherwise disabled. In another example, a repeater circuit can be similarly powered off or disabled. Triggering of the hot removal can occur through a command from the host server computer or from an external server computer. Once the simulated hot removal occurs, the agent can set a timer for a predetermined period of time. Once the timer expires, the agent can simulate a hot plug-in (process block 530) of the add-in card. The triggering of the hot plug-in can also occur through a communication on a separate bus from the connection. For example, the connection can be over a PCIe communication channel, whereas other testing-based communications can occur over an Ethernet connection. A simulated hot plug-in means that power is maintained while it appears to other devices that the add-in card was physically plugged into a slot on the host server computer. However, as explained above, the add-in card was not physically removed from the host server computer. In one example, such a simulation can occur through re-activation of the SerDes controller or other hardware. The hot plug-in can be a surprise plug-in, as identified above, or an orderly hot plug-in, wherein an attention button is activated. The hot plug-in using the attention button can be a hardware interrupt or a software-based attention button activation, such as by setting a flag in a register. Typically, during an orderly hot plug-in, the host server computer is signaled through the attention button that a hot plug-in is to occur. In process block 540, monitoring of how the host server computer responds to the hot removal and hot plug-in can occur using a host server computer external to the add-in card or through an agent executing on the host server computer into which the add-in card is plugged. Monitoring can include determining whether data on the host server computer was compromised or whether other security holes occurred.

Figure 6:
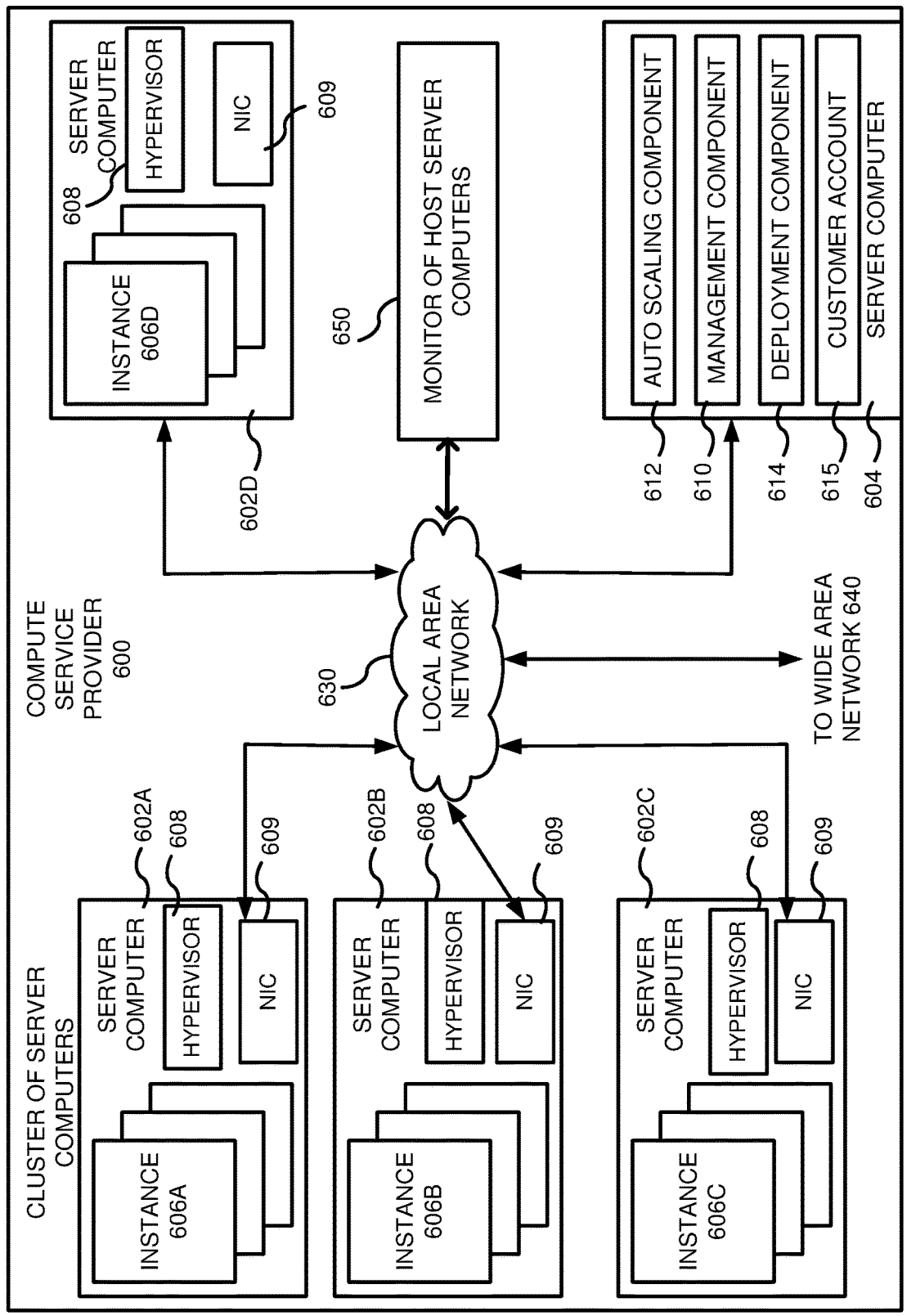
FIG. 6 is an example system diagram showing a plurality of virtual machine instances running in a multi-tenant environment with a host server computer monitoring for connection errors.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications. The hypervisor 608 and/or instances 606 communicate with a network 630 via a NIC 609. The NIC provides for two-way communication between the host servers 602 and the compute service provider 600.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

The network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Each server computer 602 can be responsible for executing local tests by using the NICs 609. The results of the tests can be monitored by a server computer 650 used to monitor how the host server computers 602 respond to modifications made to a connection using the NIC. Such testing can be performed at any desired point of time, and can be under the control of the local host server computer 602 or the external host server computers 650.

Figure 7:
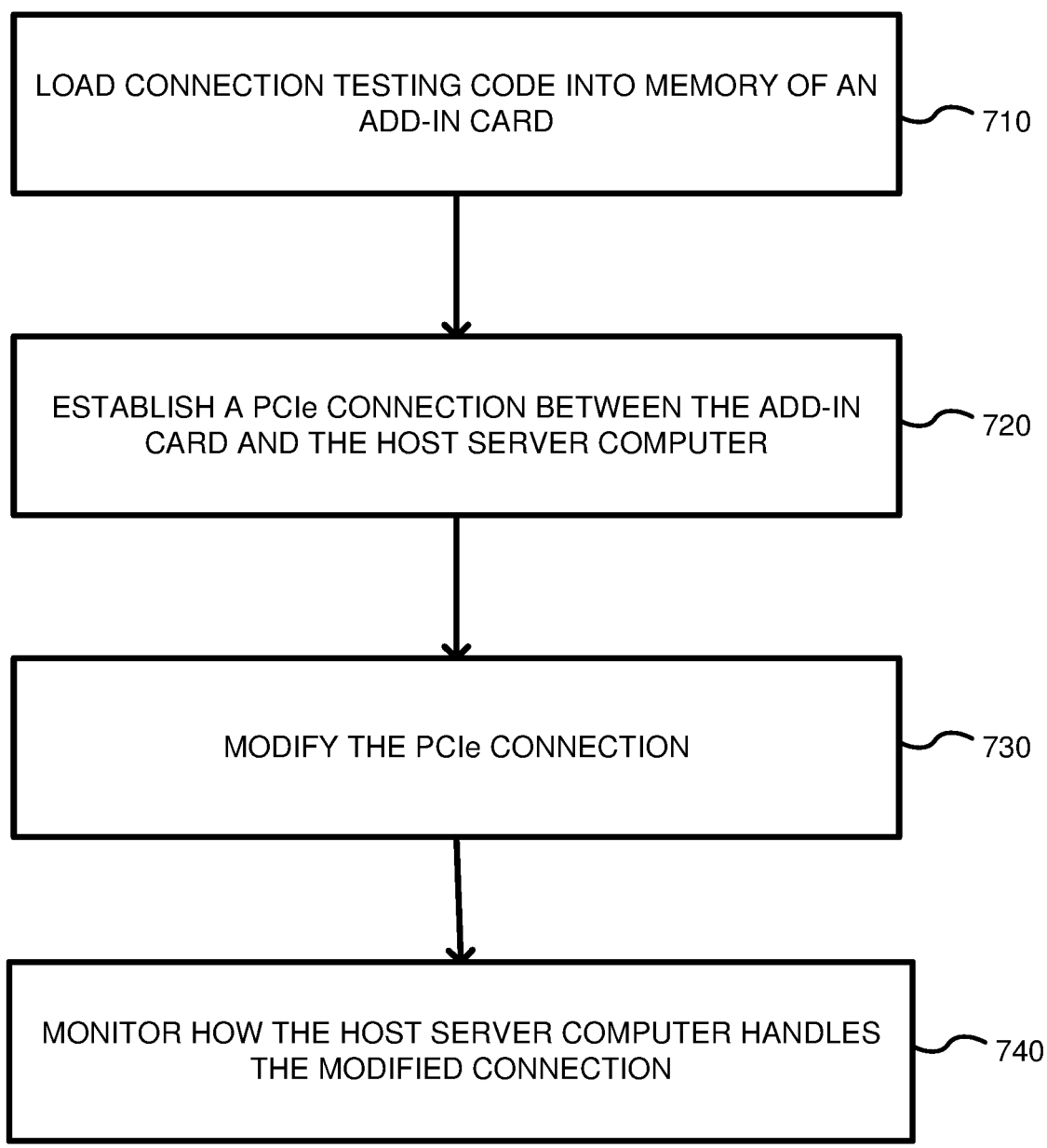
FIG. 7 is an example flowchart according to one embodiment for testing a connection in a host server computer.

FIG. 7 is a flowchart according to one embodiment for generating error testing for an add-in card positioned within a host server computer. In process block 710, testing code from the host server computer is loaded to the add-in card. The loading of the test code can occur at any time, however, such loading can occur after updates of an operating system or of the BIOS of the host server computer. The loading and the triggering of the test code can be managed from an external host server computer, such as host server computer 650 (FIG. 6). Alternatively, the loading and triggering can occur using the local host server computer in which the add-in card is plugged. The add-in card can begin to execute the test code by receiving a trigger from the host server computer. For example, the trigger can be the host computer setting a flag in a memory location of the add-in card. Alternative triggers can be used such as adding a new command to the protocol passed between the host server computer and the add-in card. An example protocol for communication between the host server computer and the add-in card can be based on the PCIe standard. In process block 720, a PCIe connection or link can be established between the add-in card and another device. Establishment of a connection can include negotiating communication-channel parameters between the add-in card and the other device. In process block 730, the PCIe connection can be modified, such as by changing the already negotiated parameters without performing a re-negotiation (e.g., parameters such as data rate or channel width can be changed). Thus, the add-in card can be communicating using different parameters than are being used by another device. Such an intentional changing of the communication channel parameters, while the connection is open and without informing the other device, results in intentional errors in the communications between the add-in card and the other device. In process block 740, monitoring is performed of how the host server computer handles errors. Such monitoring can occur from an external host server computer (e.g., server 650 from FIG. 6) that extracts log data from the host server computer upon which tests are being performed. The external host server computer can determine based on the log data that the updates to the operating system or the BIOS are operating correctly or incorrectly. If the updates pass the error testing code, then the host server computer can seamlessly switch over to an operating mode from the test mode without inserting or removing any test hardware. Thus, by using a NIC with an embedded processor, testing can be performed using the NIC and then the NIC can be switched to its normal operating mode. The NIC therefore operates as a PCIe tester and a network interface.

Figure 8:
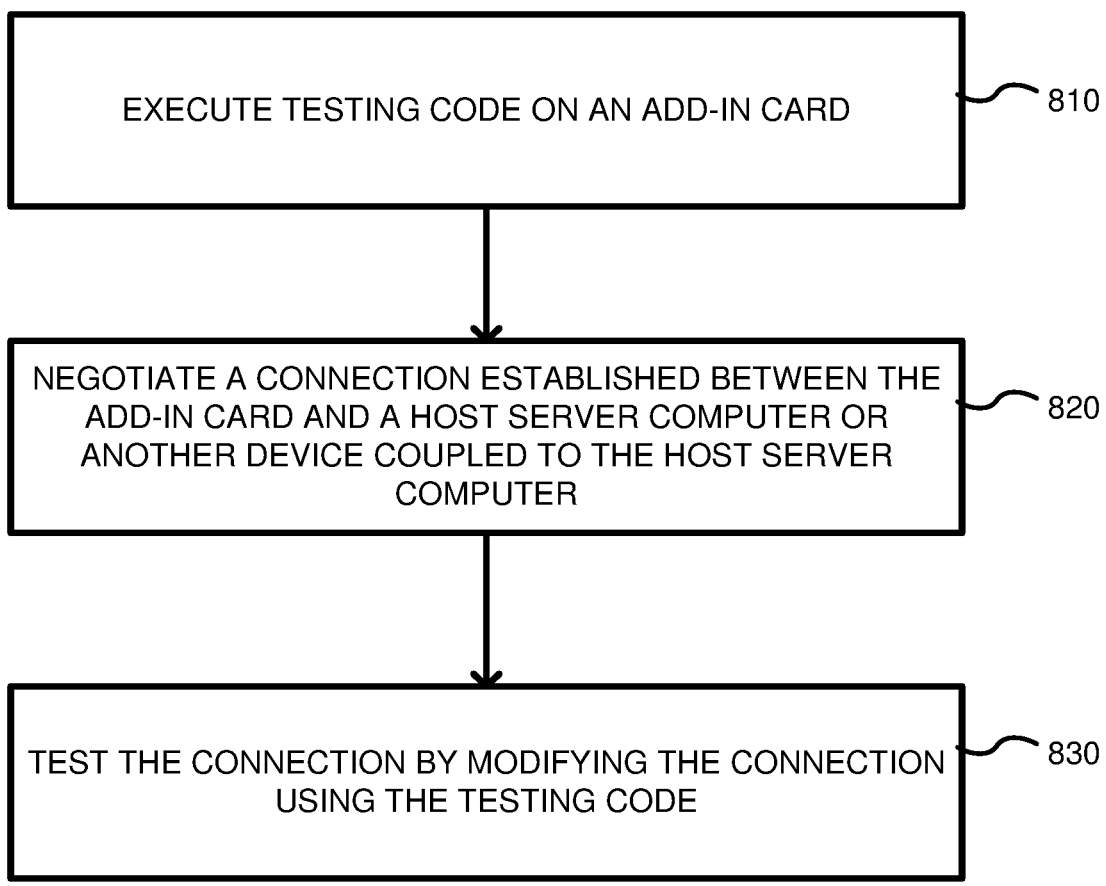
FIG. 8 is another example flowchart according to an embodiment for testing a connection in a host server computer.

FIG. 8 is a flowchart of a method according to another embodiment for error testing. In process block 810, testing code can be executed using an add-in card. The testing code can include a plurality of different tests which are individually selectable. Instead of an add-in card, the testing can be performed on any peripheral component. For example, the peripheral component can be positioned on the motherboard of the host server computer and coupled to the main processor through a PCIe communication bus. Alternatively, the peripheral component can be positioned external to the host server computer. Finally, the peripheral component can be the add-in card. In process block 820, a connection is negotiated between the add-in card and a host server computer or another device coupled to the host server computer. For example, the connection can be over a PCIe communication channel or another protocol can be used, such as Accelerated Graphics Port (AGP), Industry Standard Architecture (ISA), Micro Channel Architecture (MCA), etc. The other device can be another add-in card positioned within the same host server computer in a different slot, or an external device coupled to the add-in card through a cable connection (e.g., the add-in card can be coupled via the cable to a network and the other device can be coupled to the add-in card via the network). In process block 830, the connection can be dynamically modified by the add-in card without terminating the connection or otherwise informing the other device that parameters associated with the communication channel have been changed. For example, analog parameters can be dynamically modified by the add-in card, such as data rate. Thus, in such a situation, the other party to the connection is transmitting at a different rate than the add-in card. Such an intentional error is injected into the system to deliberately test how the system responds to the error. For example, if attackers can obtain access to customer data by injecting an agent onto an add-in card, then detection of such access is desirable.

Figure 9:
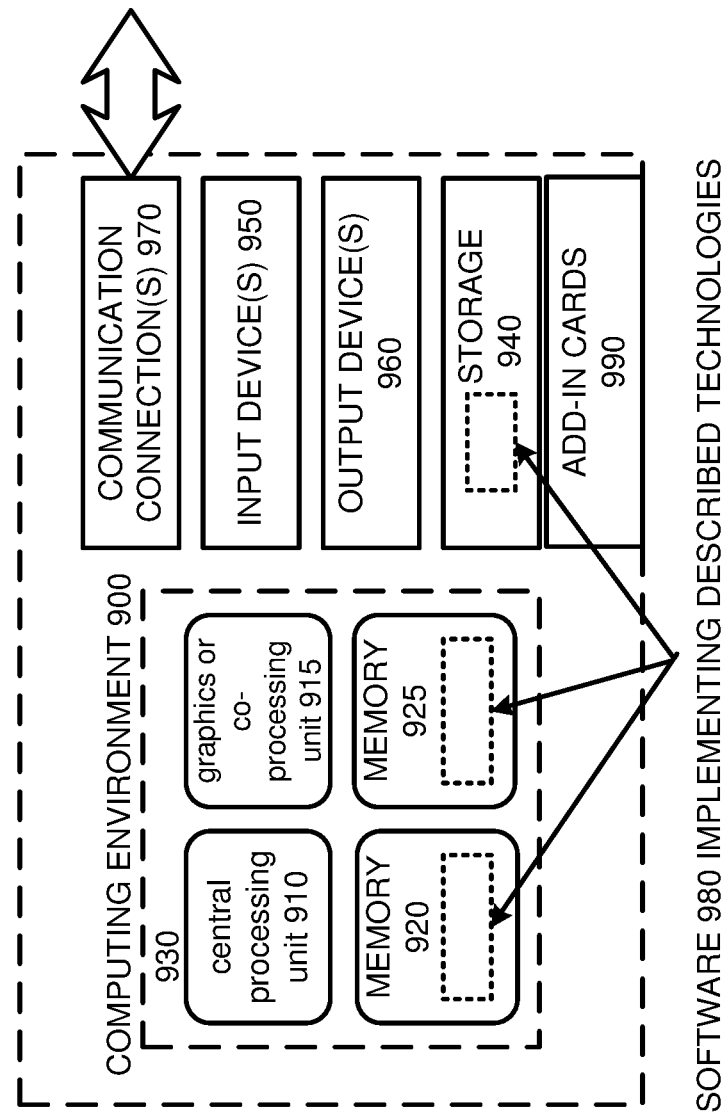
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970 (which can include a NIC). Add-in cards 990 can also be used to supplement functionality of the computing environment 900. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of testing of a communication link, the method comprising:
   loading connection testing code into a memory of an add-in card, wherein the add-in card includes an embedded processor;
   establishing a Peripheral Component Interconnect Express (PCIe) connection on a PCIe communication channel between the add-in card and a host server computer;
   receiving on the add-in card, a trigger from the host server computer to begin testing using the connection testing code;
   using the connection testing code located on the add-in card, modifying the PCIe connection; and
   monitoring how the host server computer responds to the modified PCIe connection.

2. The method of claim 1, wherein the establishing of the PCIe connection includes negotiating, between the host server computer and the add-in card, a channel parameter associated with the PCIe connection, the channel parameter including a channel width, a channel data rate, or a channel polarity.

3. The method of claim 2, wherein modifying the PCIe connection includes changing the channel parameter.

4. The method of claim 1, wherein modifying the PCIe connection includes simulating a hot removal of the add-in card, wherein the hot removal is a logical removal.

5. The method of claim 4, further including simulating a hot plug addition to the PCIe connection.

6. A method, comprising:
   executing testing code on an add-in card connected to a communication channel of a host server computer, wherein the executing of the testing code on the add-in card is triggered by the host server computer;
   negotiating a connection over the communication channel, the connection having been established between the add-in card and the host server computer or another device coupled to the host server computer; and
   testing the connection by modifying the connection using the testing code.

7. The method of claim 6, wherein the add-in card includes an embedded processor, the method further comprising:
   loading the testing code by transmitting the testing code from the host server computer to the add-in card; and
   triggering execution of the testing code by the host server computer.

8. The method of claim 6, wherein the negotiating of the connection includes establishing a communication channel parameter including a channel width, a channel data rate, or a channel polarity.

9. The method of claim 8, wherein the modifying the connection includes changing the channel parameter without re-negotiating the connection.

10. The method of claim 6, wherein the host server computer is a first host server computer and wherein the testing code is controlled by a second host server computer coupled to the first host server computer through a network.

11. The method of claim 6, wherein the add-in card is a Network Interface Card (NIC) that couples the host server computer to a network in normal operating mode.

12. The method of claim 6, further including monitoring how the host server computer handles the modified communication channel generated by the testing code.

13. The method of claim 6, wherein the communication channel is a Peripheral Component Interconnect Express (PCIe) interface.

14. The method of claim 6, wherein modifying the connection includes simulating a hot removal of the add-in card.

15. The method of claim 14, wherein the simulating of the hot removal includes manipulating a Serializer/Deserializer (SerDes) hardware component to appear as though the add-in card was removed from a slot in the host server computer.

16. The method of claim 15, further including simulating a hot plug-in of the add-in card by manipulating the SerDes hardware component to appear as though the add-in card was plugged back into the slot on the host server computer.

17. A system, comprising:
   a host server computer including a motherboard and a communication bus;
   a peripheral component including an embedded processor and a memory, the peripheral component being coupled to the host server computer; and
   testing code, wherein the embedded processor on the peripheral component is configured to execute the testing code, the testing code including a test for modifying a connection established with the peripheral component on the communication bus, wherein the test is configured to be triggered from the host server computer and executed using the embedded processor on the peripheral component.

18. The system of claim 17, wherein the communication bus is a Peripheral Component Interconnect Express (PCIe) interface bus and wherein the modifying includes modifying analog characteristics of the connection.

19. The system of claim 17, further including a Serializer/Deserializer (SerDes) hardware component coupled to the embedded processor, wherein the testing code includes instructions for simulating a hot removal of the add-in card through control of the SerDes hardware component.

20. The system of claim 19, wherein the testing code includes instructions for hot plug-in of the add-in card through control of the SerDes hardware component.

* * * * *